US009296568B2

(12) United States Patent
Peterson

(10) Patent No.: US 9,296,568 B2
(45) Date of Patent: Mar. 29, 2016

(54) ACCURACY OF FERTILIZER DISPENSED THROUGH A FIXED OPENING

(71) Applicant: AGCO Corporation, Duluth, GA (US)

(72) Inventor: John Peterson, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 36 days.

(21) Appl. No.: 14/369,842

(22) PCT Filed: Dec. 29, 2012

(86) PCT No.: PCT/US2012/072203
§ 371 (c)(1),
(2) Date: Jun. 30, 2014

(87) PCT Pub. No.: WO2013/106211
PCT Pub. Date: Jul. 18, 2013

(65) Prior Publication Data
US 2014/0339050 A1 Nov. 20, 2014

Related U.S. Application Data

(60) Provisional application No. 61/581,683, filed on Dec. 30, 2011.

(51) Int. Cl.
B65G 47/19 (2006.01)
B65G 47/74 (2006.01)
A01C 15/06 (2006.01)
A01C 15/12 (2006.01)
B65G 37/00 (2006.01)

(52) U.S. Cl.
CPC ............... B65G 47/74 (2013.01); A01C 15/06 (2013.01); A01C 15/122 (2013.01); B65G 37/00 (2013.01)

(58) Field of Classification Search
CPC ...................................................... B65G 47/19
USPC ............ 198/528, 529, 531, 540, 544, 550.01, 198/550.2, 550.4; 209/615, 616; 193/2 B, 193/2 R
See application file for complete search history.

(56) References Cited

U.S. PATENT DOCUMENTS 3,362,585 A * 1/1968 Nessim ............. B01F 15/00194
198/530
3,450,440 A * 6/1969 Hagenah .................. A24C 5/39
198/525
4,096,793 A * 6/1978 Wachter .................... C12C 3/00
198/525

(Continued)

FOREIGN PATENT DOCUMENTS

EP 0 149 274 A1 7/1985
EP 1 325 984 A2 7/2003

(Continued)

OTHER PUBLICATIONS

European Patent Office, International Search Report for Application PCT/US2012/072203, mailed Sep. 4, 2013.

Primary Examiner — Douglas Hess

(57) ABSTRACT

A conditioner for a fertilizer box configured to convey compacted particles away from a conveyor path of fertilizer particles. The conditioner may include a plurality of wings for deflecting a portion of a flow of fertilizer particles from a conveyor path. A method includes determining a constant effective dispense opening for a fertilizer box having the conditioner and using the constant effective dispense opening to determine a fertilizer dispense rate.

16 Claims, 4 Drawing Sheets

(56) References Cited

U.S. PATENT DOCUMENTS

| | | | | |
|---|---|---|---|---|
| 4,354,622 | A * | 10/1982 | Wood | G05D 7/0605 177/116 |
| 4,859,072 | A * | 8/1989 | Fey | B01F 5/0057 366/156.1 |
| 5,213,414 | A * | 5/1993 | Richard | B01F 7/08 366/156.2 |
| 6,216,850 | B1 * | 4/2001 | Svejkovksy | B65G 27/04 198/752.1 |
| 6,979,116 | B2 * | 12/2005 | Cecala | A01C 23/042 366/132 |
| 7,107,741 | B2 * | 9/2006 | Monti | B07B 13/003 53/237 |
| 7,156,263 | B2 * | 1/2007 | Hooper | G01F 13/003 198/532 |
| 8,556,066 | B2 * | 10/2013 | Honegger | B65G 65/42 198/550.2 |
| 9,079,723 | B2 * | 7/2015 | Webb | B65G 47/19 |

FOREIGN PATENT DOCUMENTS

| | | |
|---|---|---|
| GB | 989 913 A | 4/1965 |
| NL | 8 000 020 A | 8/1981 |

* cited by examiner

ACCURACY OF FERTILIZER DISPENSED THROUGH A FIXED OPENING

TECHNICAL FIELD

This invention relates to fertilizer dispensing systems, and more particularly, to dry fertilizer variable rate systems that employ a dry fertilizer box and a conveyor system to dispense fertilizer through a dispense opening.

BACKGROUND

The variable rate application of dry fertilizer typically involves a conveyor that moves fertilizer through a fertilizer box to a dispense opening. Such systems may determine a dispense rate based on the conveyor rate and the size of the dispense opening. This calculation is typically based on the assumption that the effective dispense opening remains constant regardless of the speed of the conveyor, i.e., that amount of fertilizer dispensed for a given dispense opening and length of conveyor run is generally constant, regardless of conveyor speed. For example, the dispensing system may be calibrated using the amount of fertilizer dispensed during a single revolution of a conveyor at a predetermined dispense opening size when the conveyor is run at a baseline speed and this value is then used for determining dispense rates at other conveyor speeds. At this speed the effective dispense opening is approximately the size of the actual dispense opening.

While the afore-mentioned method works fairly well when the conveyor is operated at a speed near that of the baseline speed, it is problematic when the conveyor is run at much higher speeds, at which the fertilizer particles behave differently as they attempt pass through the dispense opening. For example, the increased speed of the conveyor causes increased friction and the fertilizer particles tend to collide together and compact as the fertilizer attempts to move through the dispense opening. This results in a dispense opening having a smaller effective size when the conveyor is run at higher speeds, thereby disrupting the linear relationship of an increase in speed and amount dispensed that might be expected. This problem is particularly acute when increasing the speed of the conveyor quickly by a large amount, which may occur with precision farming systems. This smaller effective dispense opening results in less fertilizer being dispensed per conveyor revolution for a given dispense opening actual (physical), thereby resulting in inaccurate dispense rates. In an effort to overcome this problem, previous systems have tried to automate change the physical size of the dispense opening itself by employing an automated movable gate that covers the dispense opening in an effort to manipulate the size of the dispense opening to obtain a specified effective dispense rate. These systems have proven to be costly and unreliable.

OVERVIEW

Figure 1:
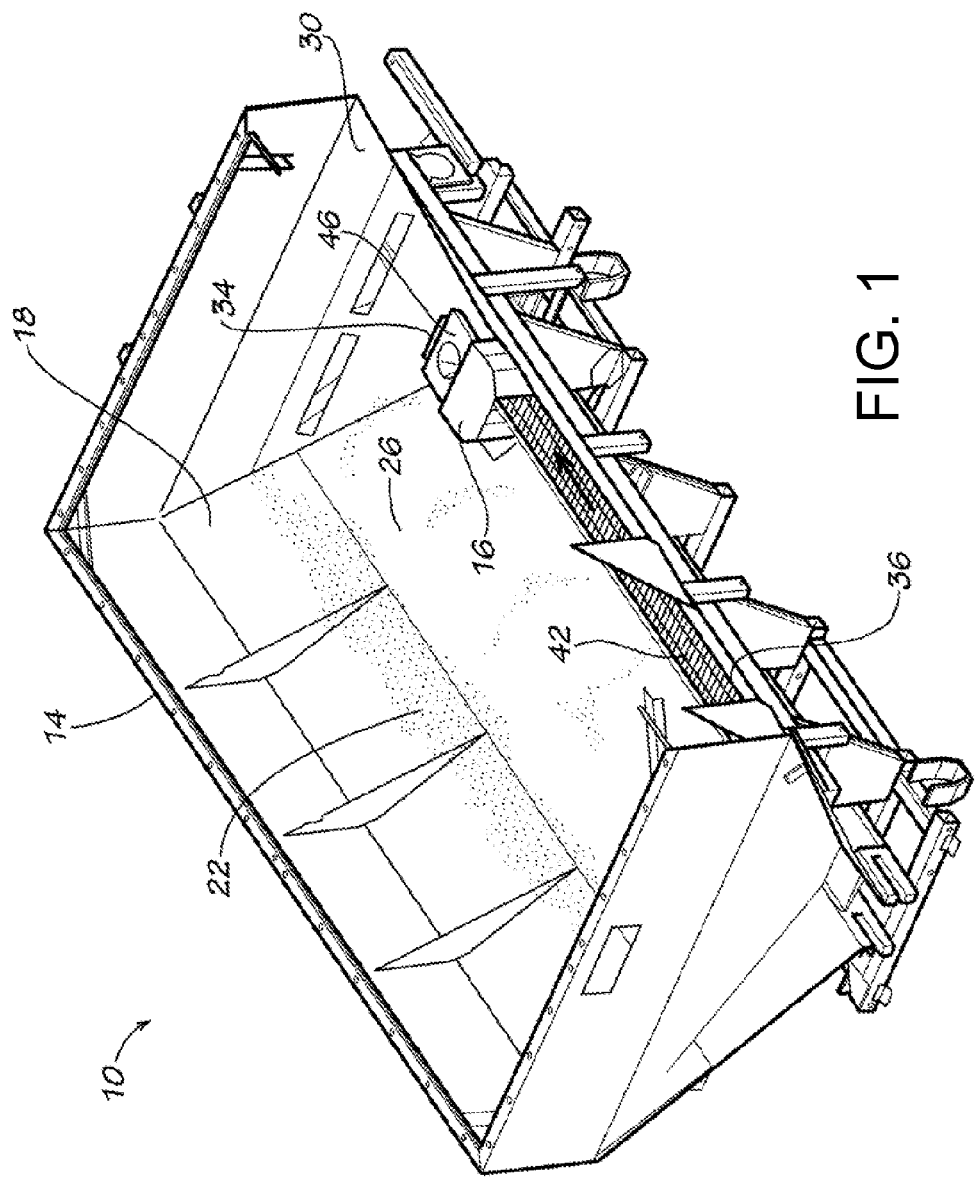
FIG. 1 shows a perspective view of an example embodiment of a variable rate fertilizer dispenser box having a fertilizer preconditioning device.

In an example embodiment, a conditioner is configured to precondition fertilizer in a conveyor flow path prior to the dispensing of the fertilizer through a fixed dispense opening of a fertilizer box. In an example embodiment, the conditioner deflects a portion of fertilizer particles in the conveyor flow path to relieve compaction and thereby ensure that the amount of fertilizer dispensed per conveyor length is uniform throughout a variety of conveyor speeds and thereby provide a constant effective dispense opening through a wide range of conveyor speeds. This allows a controller to accurately determine a dispense rate using the conveyor speed and the gate opening size.

An example embodiment of a fertilizer dispensing system includes a fertilizer box having a dispense opening for dispensing the fertilizer; a conveyor configured to move the fertilizer along a flow path through the dispense opening; and a conditioner configured to deflect compacted material out of the flow path. The system may also include a sensor to detect the speed of the conveyor and a controller to manipulate the speed of the conveyor and determine a dispense rate using the conveyor speed, and a display to display the dispense rate.

In one example embodiment, the conditioner is in the form of an open-ended pass-through structure having a plurality of wings or fins to divert a portion of fertilizer particles from a conveyor flow path. In one example embodiment, the wings are angled outward from the conveyor flow path to provide an alternate path out of the main flow path for some of the fertilizer particles. For example, the wings may be arranged at about a 45 degree angle from the lateral sides of the conveyor flow path. In one example embodiment, a set of three parallel-spaced apart wings is provided at each side of the conveyor. The space between the wings may provide relief flow paths for compacted fertilizer particles. This allows for the main flow of the fertilizer particles to move along the conveyor flow path while allowing some compacted fertilizer particles to be peeled off so that the fertilizer particles behave similarly when exiting the dispense opening over a wide range of conveyor speeds.

The conveyor may extend longitudinally through the box and through the conditioner. The conditioner may have a top that extends between the tops of the wings and across the conveyor path. The conditioner may be located near the rear of the fertilizer box and aligned with the dispense opening so that the conveyor and the resulting fertilizer flow path passes through the conditioner and out the dispense opening. The conditioner may have a first open end that serves as a mouth that is generally the size of the dispense opening and a rear opening adjacent the dispense opening. While the conditioner provides a constant effective through a gate opening which may be fixed, in some embodiments a movable gate may be provided at the dispense opening that may adjusted to vary the size of the dispense opening.

In operation, when the conveyor is started the fertilizer particles are forced rearwardly toward the dispense opening in the fertilizer box. The conveyor provides a flow path of fertilizer particles rearward down the center of the box and toward the dispense opening. As the fertilizer particles are forced rearward they tend to compact together and begin to move along the conveyor flow path. Particles on the outer edges of the conveyor flow path contact the wings. The wings deflect and peel off particles from the main flow path into a relief path thereby removing the compacted fertilizer particles from the conveyor flow path to allow for smooth and consistent flow through the dispense opening. This arrangement provides for a consistent particle flow through the dispense opening throughout a variety of speeds so that there is a consistent effective dispense gate opening.

DETAILED DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided to make this disclosure thorough and complete, and to fully convey the scope of the invention to those skilled in the art. The present invention is described more fully hereinbelow. For clarity some components which would be apparent to one of ordinary skill in the art such as the motor, gears, and the like which run the conveyor are not shown.

Turning to the figures wherein like numbers represent like elements throughout the several views, FIG. 1 shows a variable rate fertilizer dispenser system 10 having a fertilizer box 14 and a conditioner 16. The fertilizer box 14 may be a of a standard type box known to one of ordinary skill in the art and may include a hopper 18 for holding dry fertilizer 22, the hopper 18 having angled sidewalls 26 and an end wall 30 having a dispense opening 32 for dispensing fertilizer 22 from the box 14. A conveyor 36, such as a chain conveyor, may be supported on a tray 42 and run longitudinally through the center of the box 14 to the dispense opening 34. A drain structure 46 may also be provided and coupled to the conditioner 16 to allow for emptying of the box 14.

The conveyor 36 may be arranged to generate a conveyor flow path (shown in bold arrow) to convey fertilizer through the hopper 18 and out the dispense opening 34. The conveyor 36 may be powered as known in the art, such as that used in some AGCO fertilizer systems in which a continuous loop conveyor is powered by a hydraulic motor (not shown) which runs a gear (not shown) that drives the chain conveyor 36. The conveyor 36 conveys the fertilizer particles 22 in the hopper 18 rearward along the flow path shown by the arrow in FIG. 1 through the dispense opening 34.

Figure 2:
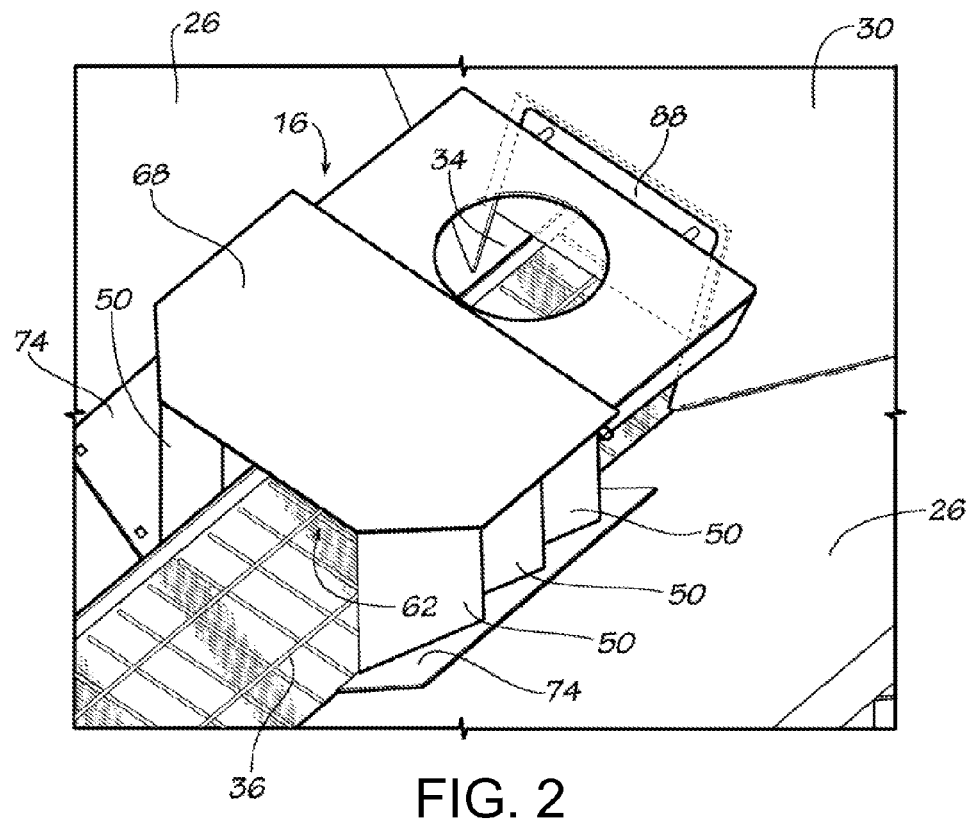
FIG. 2 shows an example embodiment of the preconditioning device installed in a fertilizer box.

As perhaps best seen in FIG. 2, in one example embodiment, the conditioner 16 comprises an open-ended pass-through structure having one or more wings 50 to divert a portion of fertilizer particles 22 from the conveyor flow path generated by the conveyor 36. The wings 50 are arranged to redirect some fertilizer particles 22 out of the flow path to alleviate compaction and provide for a constant effective dispense opening for a fixed dispense opening. The conditioner 16 may be aligned with the dispense opening 34 and the conveyor 36 such that the conveyor 36 passes through the conditioner 16 and fertilizer particles 22 in the flow path move into an open mouth 62 of the conditioner 16 and out the rear of the conditioner 16 to be dispensed through the dispense opening 34.

Figure 3:
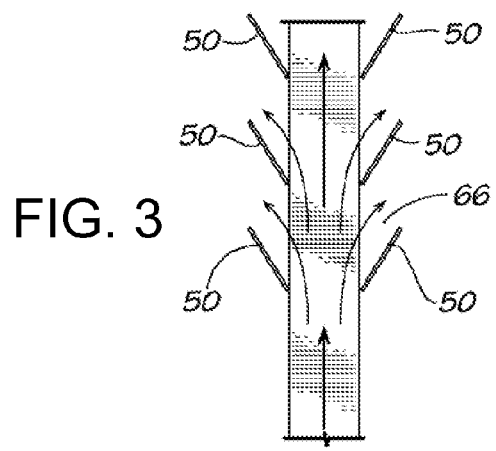
FIG. 3 shows a top plan view of an example embodiment of a fertilizer preconditioning device showing flow of fertilizer particles therethrough.

In the example embodiment of FIG. 2, three wings 50 are provided on each side of the conveyor 36 and angled outwardly downstream. The space 66 between the wings 50 may serve as relief paths (shown by small arrows) for the flow of compacted particles 22 out of the flow path. For example, as shown in FIG. 3, where the conditioner 16 is shown with its top 68 removed, as the fertilizer particles 22 are conveyed down the flow path the wings 50 deflect a portion of the particles 22 outwardly out of the flow path so that the particles 22 that do remain in the flow path exit the dispense opening 34 in a consistent manner through a variety of conveyor speeds. Thus, the conditioner 16 relieves some of the compaction typically associated with the movement of fertilizer particles in prior art systems. Applicant has found that this arrangement provides a consistent flow of fertilizer particles for a specified length of conveyor, effectively providing a constant effective size for the gate opening without having to manipulate the position of a gate to increase or decrease the physical size of the dispense opening. This arrangement allows for a controller 86 to accurately calculate a dispense rate for a variety of conveyor speeds.

In the example embodiment shown in FIG. 2, the wings 50 are angled outwardly from the conveyor flow at about a 45 degree angle from the lateral sides of the conveyor flow path. This arrangement allows for the main flow of the fertilizer particles 22 to move along the conveyor flow path while allowing compacted fertilizer particles 22 to be peeled off. This arrangement ensures that the fertilizer particles 22 behave similarly throughout a wide range of conveyor speeds and dispense opening sizes.

In an example embodiment of the conditioner 16, a top 68 may extend between the sets of wings 50 and across the conveyor 36 and the conveyor flow path so that the conveyor 36 extends through the housing 38 of the conditioner 16. The wings 50 may be mounted to the sidewalls 26 of the fertilizer box 14 by angled feet 74 that arranged to couple directly to the sidewalls 26.

In operation, when the conveyor 36 is started the fertilizer particles 22 in the fertilizer box 14 are forced rearward by the movement of the conveyor 36. The conveyor 36 thus produces a flow path of fertilizer particles moving rearwardly down the center of the box 14 and toward the dispense opening 34. As the fertilizer particles 22 are forced rearward they compact together and begin to move along the conveyor flow path. Fertilizer particles 22 on the outer edges of the conveyor flow path contact the wings 50 which deflect and peel off compacted particles 22 from the main flow path into the relief paths 66. By removing the compacted fertilizer particles 22 from the conveyor flow path, the particle flow through the dispense opening 34 is consistent throughout a variety of speeds such that there is a consistent effective gate opening.

The previous discussion has been in the context of a variable rate fertilizer dispenser having a fixed dispense opening. It should be noted that in other embodiments a movable gate 80 may be provided to manipulate the size of a dispense opening. For example, a movable gate 80 may be mounted to an exterior of the end wall 30 and raised or lowered to change the physical size of the dispense opening. The conditioner 16, however, allows for a variable dispense rate to be accomplished by manipulating the speed of the conveyor 34 without the need to change the size of the dispense opening to accommodate for the different behavior of the fertilizer particles at different conveyor speeds as with various prior art systems, as the conditioner provides for a constant effective gate opening. Thus, there is no need to change the gate height to compensate for the different conveyor speeds when calculating dispense rates, as the conditioner provides a linear relationship.

Figure 4:
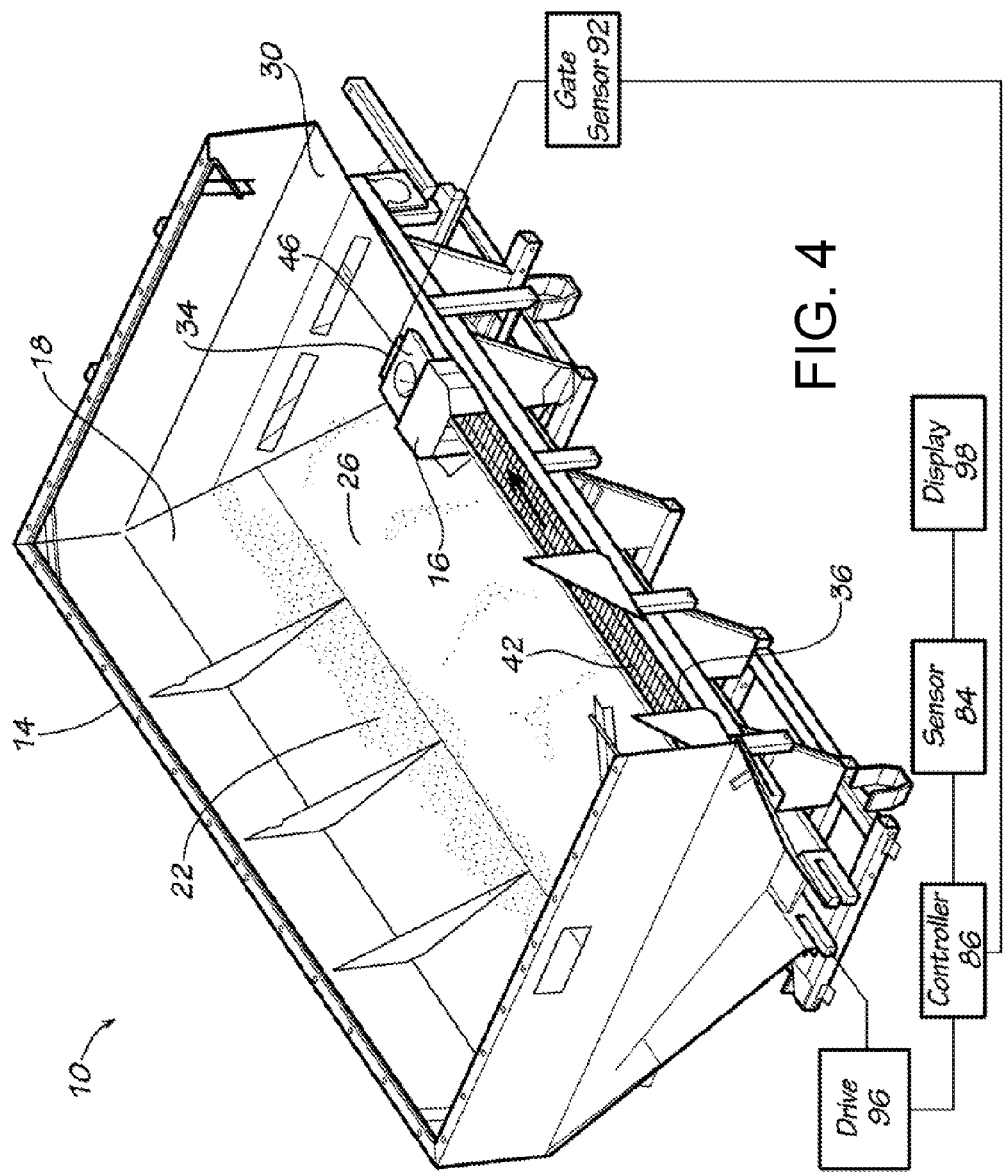
FIG. 4 shows an example embodiment of a variable rate fertilizer dispenser system including a fertilizer dispenser box having a fertilizer preconditioning device.

FIG. 4 shows a variable rate dispense system 400 that includes a rate sensor 84 configured to determine the rate of the conveyor 36. For example, the rate sensor 84 may count the number of revolutions of the conveyor per unit of time. A controller 86 may calculate a dispense rate by using the determined conveyor speed and the size of the dispense opening 34. For example, a baseline amount of fertilizer particle fed through the gate for a given height per revolution may be determined and used in conjunction with the conveyor speed to determine a dispense rate. The use of the conditioner 16 makes such a determination accurate for a variety of different speeds.

A movable gate 88 may be provided on the exterior of the rear wall 30 of the fertilizer box 14 so that the size of the dispense opening may be changed by raising or lowering the gate 88. A gate sensor 92 may be provided on the gate 88 to determine the gate's position and therefore the size of the dispense opening 34. A controller 86 may be used to determine a dispense rate using the conveyor speed, gate position, and baseline information. Furthermore the controller 86 may be configured to change the conveyor speed and/or the position of the gate 88 to achieve a desired dispense rate. For example, the controller 86 may be communicatively coupled to the rate sensor and the gate sensor to receive conveyor rate and dispense opening information and be coupled to a drive (shown schematically) for powering the conveyor 34 and send command signals to manipulate the speed of the conveyor. The controller 86 may also be coupled to a display (shown schematically) to display a determined dispense rate. The controller may include a processor 96 and a memory 98. The memory may be used to store the various effective dispense openings for the various positions of the gate height. For example, an effective gate height opening may be determined at a baseline speed for either fixed gate height or for a plurality of gate heights were a movable gate 88 is provided. This information could then be retrieved by the processor 96 and used to determine a dispense rate using a detected conveyor speed. This is possible due to the use of the conditioner which provides a linear relationship between the amount dispense through a dispense opening and the sped of the conveyor.

Figure 5:
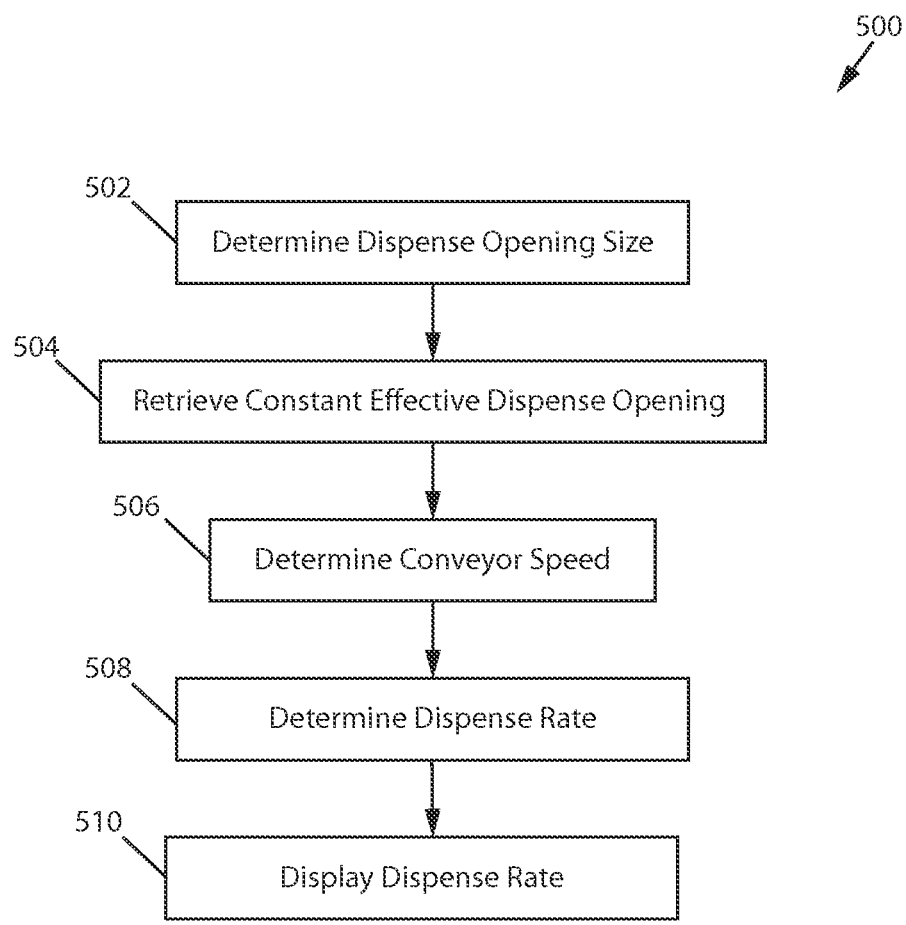
FIG. 5 shows an example method of determining a fertilizer dispense rate for a fertilizer box having a fertilizer conditioner.

FIG. 5 shows a flow diagram of an example method 500 of the invention. At block 502 the physical size of a dispense opening may be determined. For example, a gate sensor 92 may be used to determine the physical height of the gate opening. On the other hand, the fertilizer box may have a fixed dispense opening height in which case the height is known.

At block 504 the constant effective dispense opening is retrieved. For example, a constant effective dispense opening may have been previously determined by running the conveyor 36 at a baseline speed through the conditioner 16 and determining the amount of fertilizer dispense per unit of movement of the conveyor 36. Because the conditioner provides for similar treatment of the fertilizer material at various speeds, a constant effective dispense opening can be determined.

At block 506, the conveyor speed may be determined. For example, the speed of the conveyor may be determined by us of a sensor 84.

Having the constant effective dispense opening and the conveyor speed, at block 508 a dispense rate may be determined by using these two inputs. This data may then be provided on a display at block 510. This method provides for a simple and accurate determination of a dispense rate through a variety of different speeds of the conveyor.

What is claimed is:

1. A fertilizer dispensing system, comprising:
    a fertilizer box configured to hold fertilizer particles, the fertilizer box having a dispense opening for dispensing the fertilizer particles therethrough;
    a conveyor configured to move the fertilizer particles along a flow path through the dispense opening; and
    a conditioner configured to deflect a compacted portion of the fertilizer particles out of the flow path to provide a constant effective dispense opening throughout a variety of conveyor speeds, the conditioner comprising a structure having a to and sides formed by a plurality of spaced-apart wings angled outwardly in a downstream direction of said conveyor and forming at least one space between adjacent spaced-apart wings through which said compacted portion is removed by said conditioner from the flow path and away from the dispense opening.

2. The fertilizer dispensing system of claim 1, further comprising:
    a non-automated gate assembly configured to cover a portion of the dispense opening.

3. The fertilizer dispensing system of claim 2, further comprising:
    a controller configured to manipulate the speed of the conveyor to achieve a desired dispense rate in response to the speed of the conveyor and the size of the dispense opening.

4. The fertilizer dispensing system of claim 1, further comprising:
    a controller configured to calculate a fertilizer dispense rate using the speed of the conveyor and a determined size of the effective dispense opening.

5. A variable fertilizer dispensing apparatus, comprising:
    a conditioner configured for mounting within a fertilizer box having a feed conveyor to move fertilizer particles down a flow path to a dispense opening in the fertilizer box, wherein the conditioner comprises a structure having a top and sides formed by a plurality of spaced-apart wings angled outwardly in a downstream direction of said feed conveyor and forming at least one space between adjacent spaced-apart wings such that the conditioner is configured to deflect a portion of the fertilizer particles from the flow path through said at least one space between said spaced-apart wings.

6. The apparatus of claim 5, wherein the said plurality of wings is adjacent to the flow path of the conveyor.

7. The apparatus of claim 5, wherein the wings are provided in a spaced apart arrangement to provide a relief flow path therebetween.

8. The apparatus of claim 5, wherein the conditioner is configured for mounting within the fertilizer box.

9. A method, comprising:
    creating a conveyor flow of fertilizer particles in a fertilizer box toward a dispense opening in the fertilizer box; and
    peeling off a portion of the fertilizer particles from the flow to produce a constant effective gate opening
    determining a constant effective dispense opening of a fertilizer box having a preconditioner for conditioning a conveyor flow of fertilizer particles prior to dispensing through the dispense opening, wherein the step of determining a constant effective dispense opening of a fertilizer box comprises determining an amount of conditioned fertilizer dispensed through the dispense opening at a baseline conveyor speed.

10. The method of claim 9, further comprising:
    determining a conveyor speed of a conveyor of the fertilizer box.

11. The method of claim 9, further comprising:
    wherein the fertilizer box has a movable feed gate for changing a size of the dispense opening, determining the position of the movable feed gate.

12. The method of claim 9, further comprising:
    determining a fertilizer dispense rate using the constant effective dispense opening and a conveyor speed rate of the fertilizer box.

13. The method of claim 12, further comprising:
displaying the dispense rate.

14. A method comprising:
creating a conveyor flow of fertilizer particles in a fertilizer box toward a dispense opening in the fertilizer box;
peeling off a portion of the fertilizer particles from the flow to produce a constant effective gate opening;
determining a speed of a conveyor creating a flow path of fertilizer particles through a dispense opening of the fertilizer box, the fertilizer particles preconditioned by a conditioner; and
determining a dispense rate of the fertilizer particles using the constant effective dispense opening and the speed of the conveyor, wherein the determined speed of the conveyor is different from a baseline speed used to determining the constant effective opening.

15. The method of claim 14, further comprising:
determining the size of a dispense opening in the fertilizer box.

16. The method of claim 15, wherein the step of determining the size of a dispense opening in the fertilizer box comprises detecting the position of a movable gate relative to the dispense opening.

\* \* \* \* \*